Jan. 17, 1933.  A. R. BLACK ET AL  1,894,660
VALVE LOCK
Filed Feb. 11, 1932
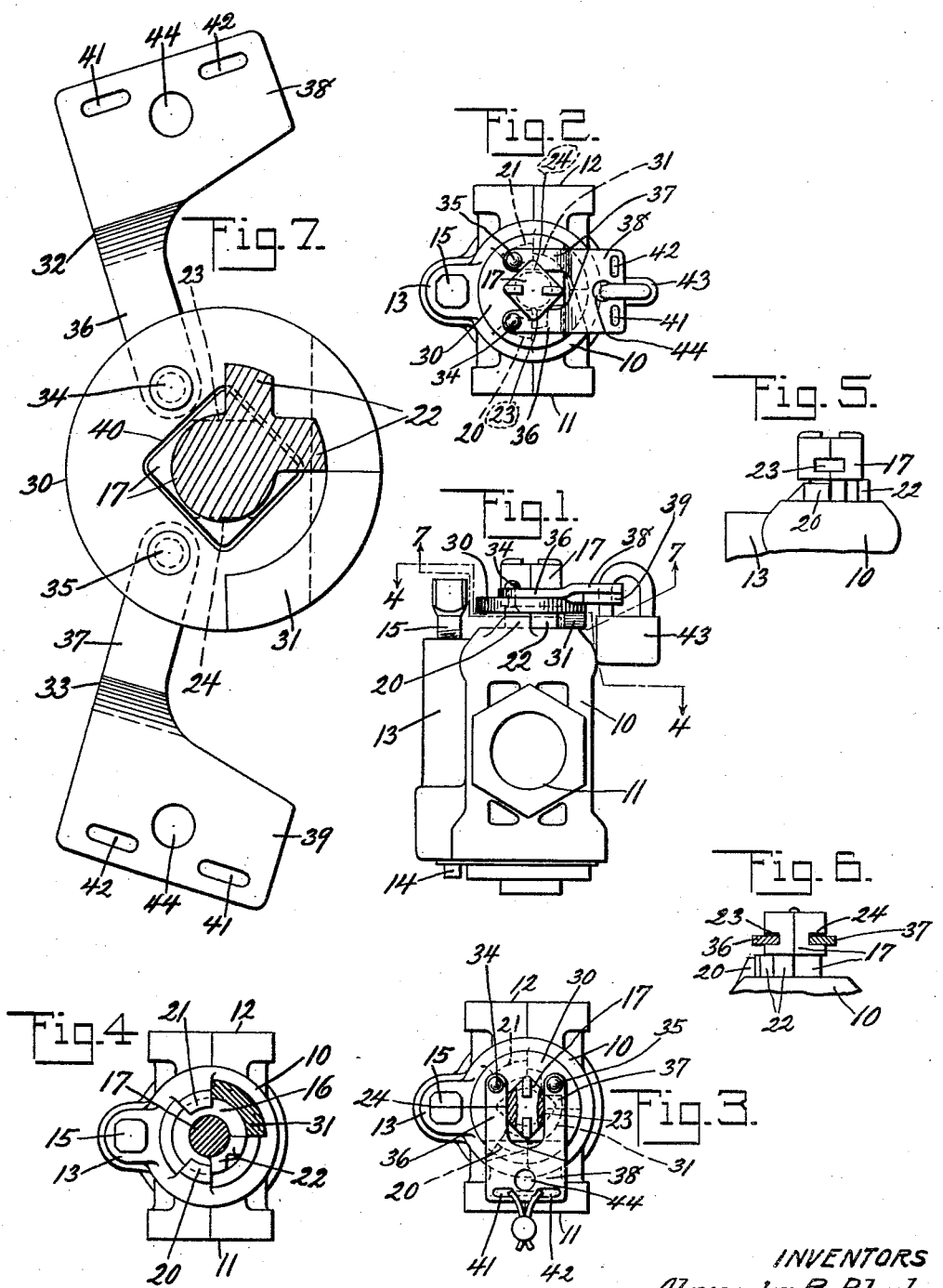
INVENTORS
Alexander R. Black
Robert Clade
BY J. H. Gibbs
ATTORNEY Patented Jan. 17, 1933

1,894,660

UNITED STATES PATENT OFFICE

ALEXANDER R. BLACK AND ROBERT CLADE, OF DETROIT, MICHIGAN, ASSIGNORS TO AMERICAN CAR AND FOUNDRY COMPANY, OF NEW YORK, N. Y., A CORPORATION OF NEW JERSEY

VALVE LOCK

Application filed February 11, 1932. Serial No. 592,236.

This invention relates to sealing and locking devices for valves and with regard to certain more specific features thereof to an attachment for application over the extended end portion of a valve plug whereby the latter may be sealed or locked, or both, in any of its definite positions of rotation in the valve casing.

The invention has for one of its objects the provision of a simple, inexpensive and readily detachable device which may be applied with equal facility in a plurality of rotative positions of the valve plug and which is equally effective for sealing or locking the valve in open or closed condition.

Another object of the invention is to provide a light-weight, compact seal and lock for valves in which the relation of the parts and the manner of arrangement with the valve causes it to withstand severe abuse, as where there might be attempt to make unauthorized use of the valve.

Other objects will be in part obvious and in part pointed out particularly hereinafter.

The invention accordingly consists in the various features of construction, arrangements of parts and combinations of elements which will be exemplified by the construction hereinafter set forth and shown in the accompanying drawing and the scope of the application of which will be indicated in the appended claims.

Referring to the drawing, wherein is shown one of various possible embodiments of the invention:—

Figure 1 is a view in elevation of a rotatable plug valve of the Milliken type slightly modified and fitted with the improved sealing and locking device. The valve is shown locked in closed position.

Fig. 2 is a top plan view of the assembly shown in Fig. 1.

Fig. 3 is a plan view similar to Fig. 2, but with a part of the plug end extension broken away to show the transverse and parallel slots therein. The valve is shown sealed in open position.

Fig. 4 is a view in section on the line 4—4, Fig. 1.

Fig. 5 is a fragmentary view showing the upper part of the valve casing, the extended end of the rotatable plug and one of the transverse slots therein.

Fig. 6 is a view taken at a right angle to Fig. 5 showing both of the transverse slots and the shanks of the pivoted arms fitting therein.

Fig. 7 is a sectional view enlarged to substantially actual size of the plug parts and attachment taken on the line 7—7 of Fig. 1, but showing the pivoted arms spread to allow for positioning of the device over the plug end.

The particular valve shown in the drawing is a lubricated plug valve of the Milliken type as shown in United States Reissue Patent No. 17,337, but it will be understood that the sealing and locking attachment may be applied to various other rotatable plug valves.

Referring to the drawing more in detail, a valve casing is indicated at 10 having ports at 11 and 12 and a lubricant receptacle 13. A lubricant plug is shown at 14 and a lubricant set screw is shown at 15.

A vertical plug 16 is rotatively mounted in the valve body or casing and is provided with a stem or upper end extension 17. This extension is preferably in the shape of a regular or equilateral polygon, although conceivably it might take other forms which would allow for the application of the attachment equally as well as a regular, rectangular, octagonal or hexagonal shape. The valve casing is provided with cast integral stop lugs 20 and 21 and the rotatable plug has also on its end extension a stop lug 22 arranged rotatively between the valve casing lugs 20 and 21. In a standard form of the valve proper the lugs 20 and 21 are spaced substantially 180° apart and the stop lug on the valve stem occupies substantially 90°, so that the movement of the valve plug is limited to a range of approximately 90°.

In converting a standard Milliken valve to be capable of use with the sealing and locking attachment it is only necessary to provide diametrically opposed, transverse, substantially parallel slots 23 and 24 in the wrench-faced extension of the rotatable plug.

These slot are shown clearly in Figs. 5 and 6 of the drawing.

The sealing and locking attachment comprises a body member 30 preferably in the form of a metal disc having a downwardly projecting lug 31 extending circumferentially approximately 90°. On the upper face of the body member two arms 32 and 33 are pivoted as indicated at 34 and 35. The arms are preferably of sheet metal having narrow shank portions 36 and 37, respectively, and enlarged outer ends or heads 38 and 39. The shank portions of the arms are arranged in the same transverse plane, but in a preferred form of the invention the outer enlarged ends are offset from the shanks, one upwardly and the other downwardly, so that the arms may be moved from the outer position shown in Fig. 7 inwardly until one enlarged head overlies and registers with the other. The body member is provided with a central aperture 40 preferably of regular polygonal shape which conforms to the shape of the wrench-faced end extension of the valve plug, thereby permitting the attachment to be assembled with the plug by slidably fitting the body member over the plug end until either the lug 31 rests upon the top of the valve casing or the underface of the body member 30 rests upon the stop lugs 20 and 21. In this position the shanks of the pivoted arms are opposite the transverse slots 23 and 24 so that as the arms are moved pivotally inward to register the outer heads thereof the shanks are moved inwardly beyond the boundary of the central aperture 40 and into the slots 23 and 24. In this position the arms may be secured by the usual wire and lead seal passed through registered pairs of openings 41 and 42 or by any band or other suitable seal passing through these openings and may be more securely held and locked by a padlock 43 or other interlock passing through the matched or registered holes 44. By the projection of the arm shanks into the slots 23 and 24 the attachment is maintained in vertical relation to the plug and by this engagement plus the slidable but non-rotative association of the body member with the wrench-faced end of the plug the attachment is rotatively coupled with the plug.

In assembly of the attachment with the valve as just previously described, the downwardly projecting lug 31 has one end or the other brought against one of the stop lugs 20 and 21 projecting upwardly from the valve casing. This is in accordance with the angular position of attachment of the parts and whether, for example, the arm shank 37 is engaged in the slot 23 or in the slot 24. The locking of the plug rotatively with respect to the casing is effected by attaching the device so that the lug 31 will abut the valve casing stop lug which is diametrically opposite the one abutted by the stop lug 22 on the valve plug. In this manner the lug 22 on the plug prevents rotation of the plug in one direction and the lug 31 on the attachment prevents rotation of the plug in the other direction, as clearly shown in Fig. 4 of the drawing.

It will be seen that the device is particularly sturdy and compact, that it may be applied quickly and conveniently, that the manner of application is obvious and that the modification of the standard valve construction is no more than the cutting of the diametrically opposed transverse slots.

What is claimed is:

1. A valve casing having spaced lugs, a rotatable plug in said casing having a stem provided with a wrench-faced end and a stop lug alternatively cooperative with said spaced lugs, said wrench-faced end having oppositely disposed transverse slots; in combination with a device for sealing the plug in either of two rotative positions, comprising a body member apertured to fit over said plug end, a pair of arms pivoted on said body member and movable to enter said slots respectively and simultaneously register seal receiving portions of the respective arms.

2. The combination of a valve having a casing with exterior spaced stops, and a rotatable plug with exterior end extension having opposed substantially parallel slots and an integral lug disposed between said spaced stops; of a locking device to hold the plug in either extreme position permitted by the said stops, comprising a body member apertured to fit over the plug end, a pair of arms pivoted on one face of the body member and movable respectively into said slots to bring the outer ends of said arms into registration for application of a lock or seal, and a projection from the opposite face of said body member adapted to prevent rotation of the plug by one or the other of said casing stops according to optional arrangement of the body member on the plug end for engagement of the arms in the slots.

3. The combination of a valve casing with exterior spaced stop lugs and a rotatable plug extension therebetween, said extension having a regular polygonal end with diametrically opposed slots therein, with a sealing device for the plug in either of different rotary positions, said device comprising a disc, having a central aperture of regular polygonal shape fitting slidably over the plug end, a lower face seating on said lugs and a downward projection rotatively between said lugs, and pivoted members movable over the upper face of said disc to register their free ends and simultaneously cause portions of each of said pivoted members to enter said slots respectively.

4. A valve lock comprising a metal disc having an opening of regular wrench face shape and a stop on the lower side thereof, arms pivoted on the upper side of the disc having shanks and free ends provided with matching holes for interlock members; said arms being relatively so connected to the disk that movement of the arms to match the holes in the heads positions the shanks inwardly over portions of the opening in said disc.

5. A valve lock comprising a body member apertured to fit over a plug end and having a stop lug on one transverse face, a pair of plate metal arms pivoted to swing toward and away from each other on an opposite transverse face of the body member, said arms having shanks and enlarged outer ends and being movable to register their outer ends, one over the other, simultaneously closing the shanks inwardly beyond the edge of said aperture, and said enlarged ends having registering openings.

6. A valve seal comprising a metal disc with downwardly projecting stop lug and a central aperture of shape permitting the disc to be fitted slidably onto a wrench-faced plug end in different angular positions, a pair of arms pivoted on the upper face of said disc and provided with transversely alined shanks and enlarged relatively offset heads, said arms being relatively so arranged on the disk that diverging movement thereof spaces the shanks outwardly beyond the aperture and converging movement registers the offset heads one above the other and positions the shanks inwardly beyond the aperture boundary.

7. A valve seal comprising a metal disc with downwardly projecting stop lug and a polygonal equilateral central aperture, and a pair of arms pivotally mounted on the upper face of the plate and movable from respective positions outwardly beyond said aperture to positions of registration of the free ends of the arms wherein portions of the arms lie inwardly to a limited extent over the aperture.

8. The combination with a valve having a casing, a rotatable plug having an extension with diametrically opposed transverse slots, and stop means for limiting the plug at both ends of a substantially 90° rotation; of a sealing or locking attachment having an arm movable into one of said slots, and a stop lug, said attachment being removable and shiftable angularly for application to present the arm for movement into the other slot.

9. The combination with a valve having a casing, a plug rotatable therein having a wrench-faced end extension and diametrically opposed transverse slots in the extension, of spaced stop lugs on the casing and a stop lug on the extension defining limits of valve movement at opened and closed positions, and a locking or sealing attachment comprising a stop lug and a pivoted arm having seal or lock receiving means near its free end and means for fitting said attachment over the plug extension so as to move the arm into one or the other of said slots and thereby position the stop lug of the attachment against the casing lug opposite the one engaged by the stop lug on the plug extension.

10. A valve locking device comprising a metal disc having an aperture of a shape to non-rotatively fit the disc to a plug end, a stop lug depending from said disc, a pair of pivoted arms having outer ends which register when the arms are moved inwardly and having intermediate portions which overlie part of the aperture when the ends are in registration.

11. A valve locking device comprising a metal disc having an aperture of a shape to non-rotatively fit the disc to a plug end, a stop lug depending from said disc, and a pair of members carried by said disc and relatively movable into and out of register for the reception of an interlock, one of said members being pivoted so that movement to register position causes a portion of it to overlie a portion of the aperture in said disc.

12. A valve locking device comprising a body member having an aperture of a shape to non-rotatively fit the body in different predetermined angular relation over a wrench-faced plug end, a stop lug projecting downwardly from said body member, and a pair of arms pivoted on the upper face of said member and movable to register the outer ends of the arms and simultaneously present portions of the arms over parts of said aperture.

13. A valve casing, a rotatable plug therein having a wrench-faced end extension and diametrically opposed transverse slots in combination with a plate apertured to slidably and non-rotatively fit over said end extension, a depending stop lug on said plate, pivoted arms on said plate movable to bring their free ends into registry and simultaneously enter said opposed slots, means for securing the arm ends in registry, and spaced stop lugs on the valve casing one or the other of which is cooperative with the stop lug on said plate according to optional positioning of the plate over said end extension.

14. A valve locking device comprising a body member having an aperture, a pair of arms pivoted to the body member at points eccentric on said body member, said arms being so formed and said pivots being relatively so arranged that said arms may be swung to overlapping relation at the outer end portions thereof.

15. A valve locking device comprising a body member having an aperture of a shape to non-rotatively fit the member to a plug end, a stop element formed with said body member, a pair of arms pivoted to said body member and having outer ends adapted to register when the arms are moved inwardly and having intermediate portions which overlie part of the aperture when the ends are in registration.

16. A valve locking device comprising a body member having an aperture of a shape to non-rotatively fit the body member to a plug end, a pair of arms, and pivots connecting the arms to the body member so arranged that when said arms are moved in one direction portions intermediate the ends thereof overlie the aperture in said body member.

17. A valve locking device comprising a body member having an aperture, a pair of arms pivotally connected to the body member and having free end portions so formed as to overlie each other when said arms are moved in one direction on their pivots.

18. In a valve locking device, a body member having an aperture adapted to fit a plug end, and a pair of arms pivoted to the body member for swinging movement toward each other to engage said arms with said plug end.

In witness whereof we have hereunto set our hands.

ALEXANDER R. BLACK.
ROBERT CLADE.